United States Patent [19]
Zäh

[11] Patent Number: 5,156,514
[45] Date of Patent: Oct. 20, 1992

[54] SHELF-TYPE STORAGE, RETRIEVAL AND TRANSFER SYSTEM FOR MATERIAL CONTAINED IN SELF-SUPPORTING STORING PALLET BOXES OR MAGAZINES

[75] Inventor: Horst Zäh, Oberkirch, Fed. Rep. of Germany

[73] Assignee: Keuro Maschinenbau GmbH & Co. KG, Achern-Gamshurst, Fed. Rep. of Germany

[21] Appl. No.: 690,367

[22] Filed: Apr. 24, 1991

[30] Foreign Application Priority Data

May 22, 1990 [DE] Fed. Rep. of Germany ....... 4016810

[51] Int. Cl.⁵ ................................. B66F 9/07
[52] U.S. Cl. ................... 414/278; 414/282; 414/285; 414/497; 414/531
[58] Field of Search ............... 414/267, 268, 269, 272, 414/278, 279, 281, 282, 285, 285, 497, 531, 528

[56] References Cited

U.S. PATENT DOCUMENTS

| | | |
|---|---|---|
| 3,426,922 | 2/1969 | Massey . |
| 3,978,995 | 9/1976 | Zollinger et al. ................... 414/279 |
| 4,010,855 | 3/1977 | Smith . |
| 4,450,400 | 5/1984 | Gwyn ............................. 414/278 X |
| 4,764,078 | 8/1988 | Neri ................................ 414/279 X |
| 4,787,804 | 11/1988 | Edenäs . |

FOREIGN PATENT DOCUMENTS

| | | | |
|---|---|---|---|
| 0329642 | 8/1989 | European Pat. Off. ............ | 414/279 |
| 2925469 | 1/1981 | Fed. Rep. of Germany . | |
| 0255114 | 3/1988 | Fed. Rep. of Germany ...... | 414/278 |
| 3708401 | 9/1988 | Fed. Rep. of Germany . | |
| 3733146 | 11/1988 | Fed. Rep. of Germany . | |
| 0105825 | 5/1987 | Japan ................................. | 414/278 |

*Primary Examiner*—Michael S. Huppert
*Assistant Examiner*—James Eller
*Attorney, Agent, or Firm*—Frishauf, Holtz, Goodman & Woodward

[57] ABSTRACT

In a shelf-type store for magazines with material in rod or plate form, an apparatus is described for putting the material, contained in the magazines, into and out of store and for selecting it. For this purpose the magazines are moved with the aid of a transport car mobile beneath the shelving units, one of the magazine places of the truck including a hoist device. Adapted to this, the station for putting material into and out of store, lying outside the shelving units, is arranged with two reception levels, arranged one above the other for the magazines, of which the upper level is reachable for the transport car through its hoist device while the lower level may be brought into connection with the level of the transport car directly by a transfer device for the magazines.

19 Claims, 17 Drawing Sheets

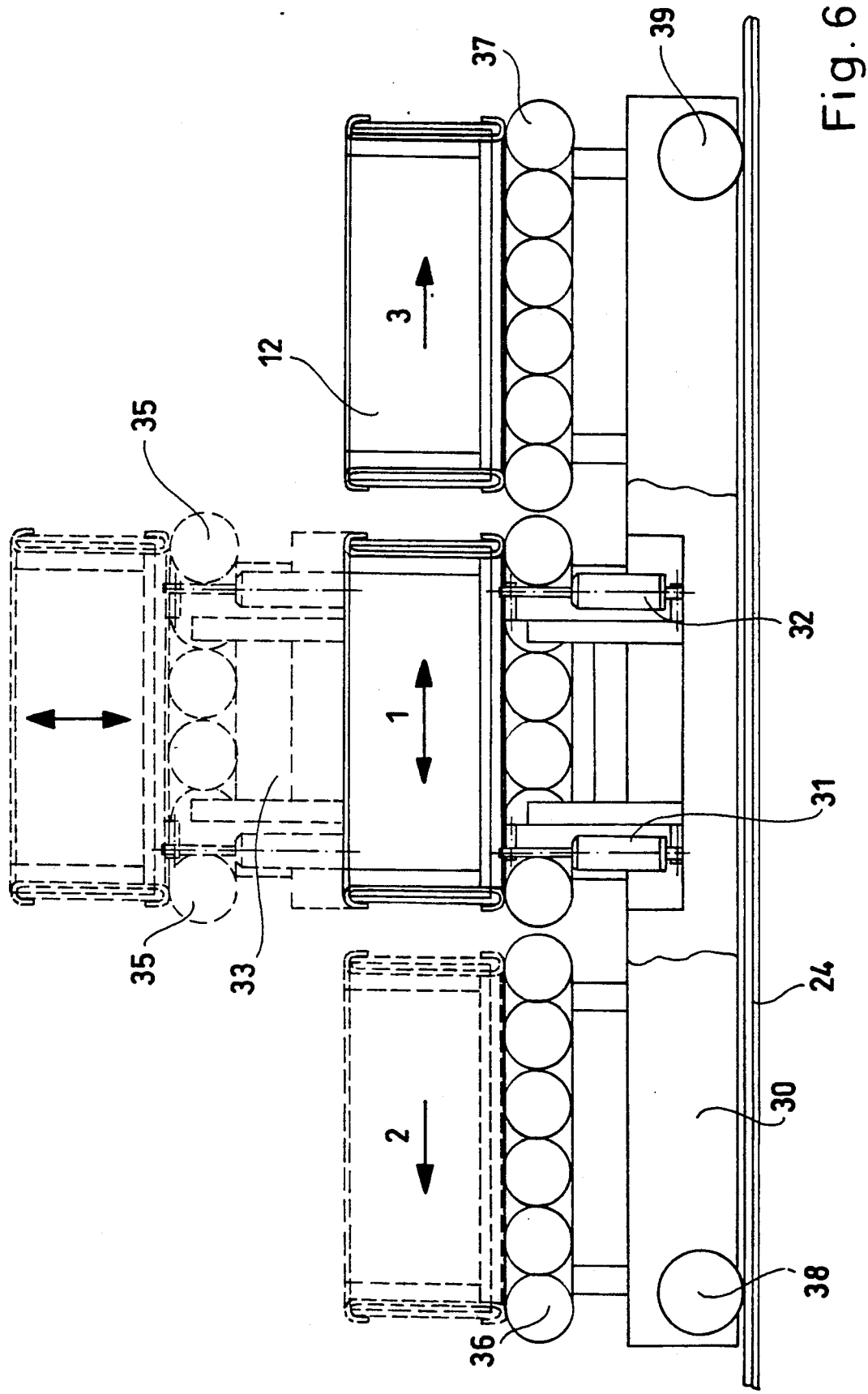

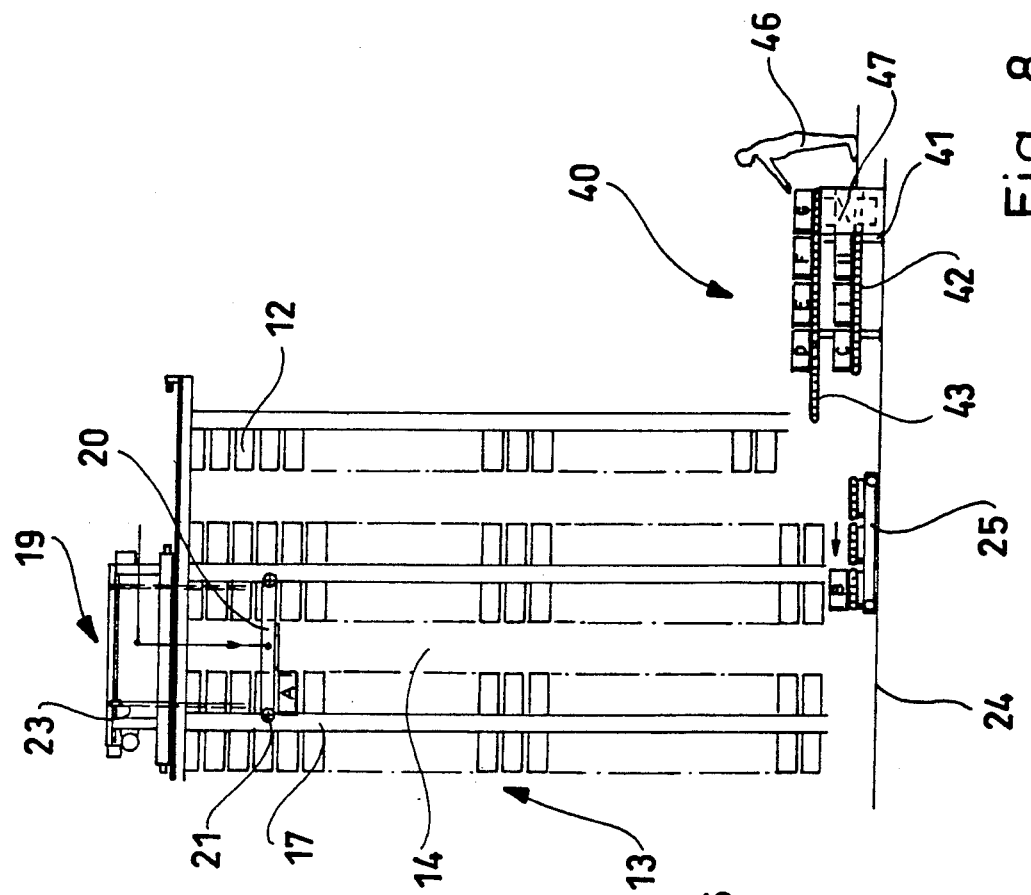
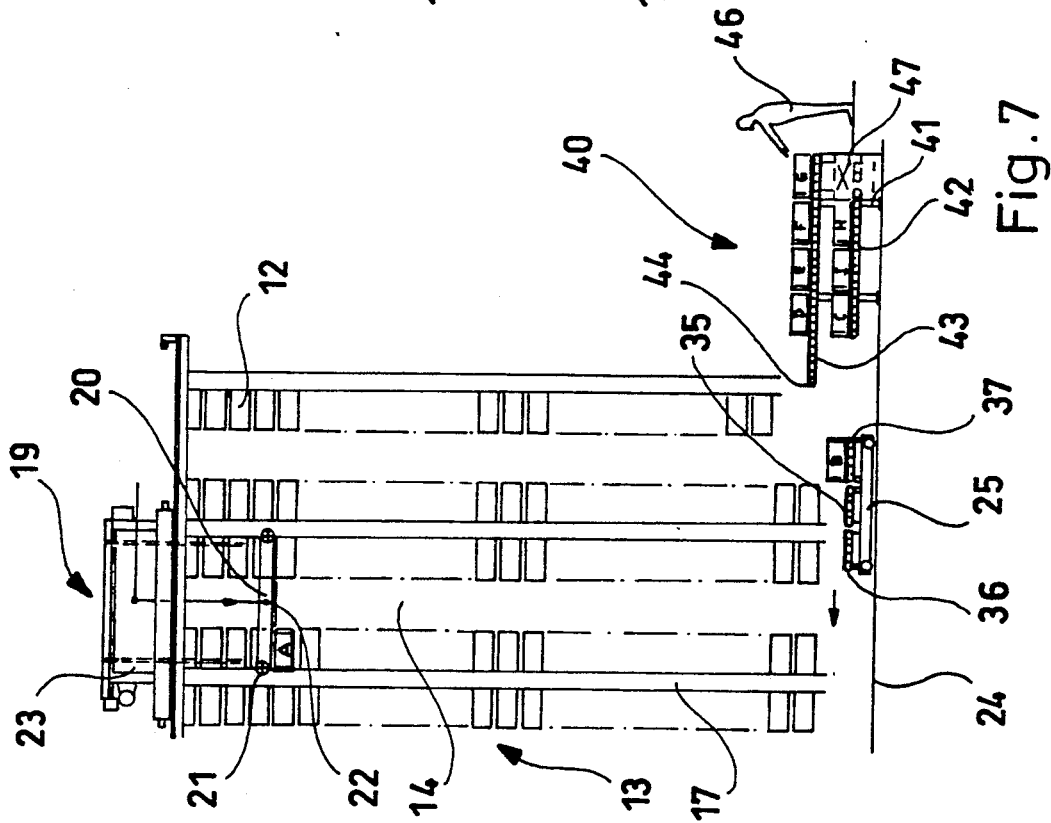

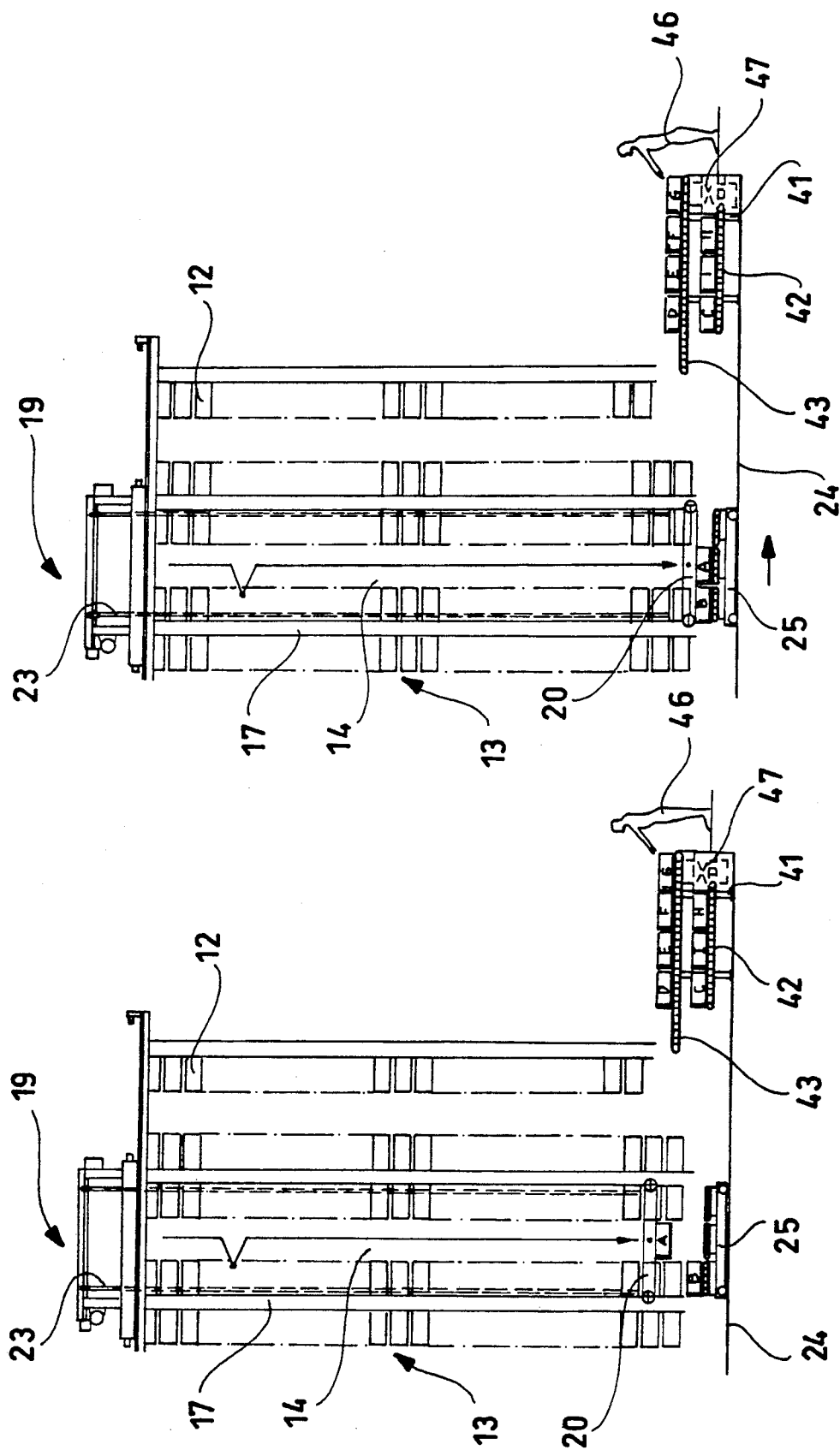

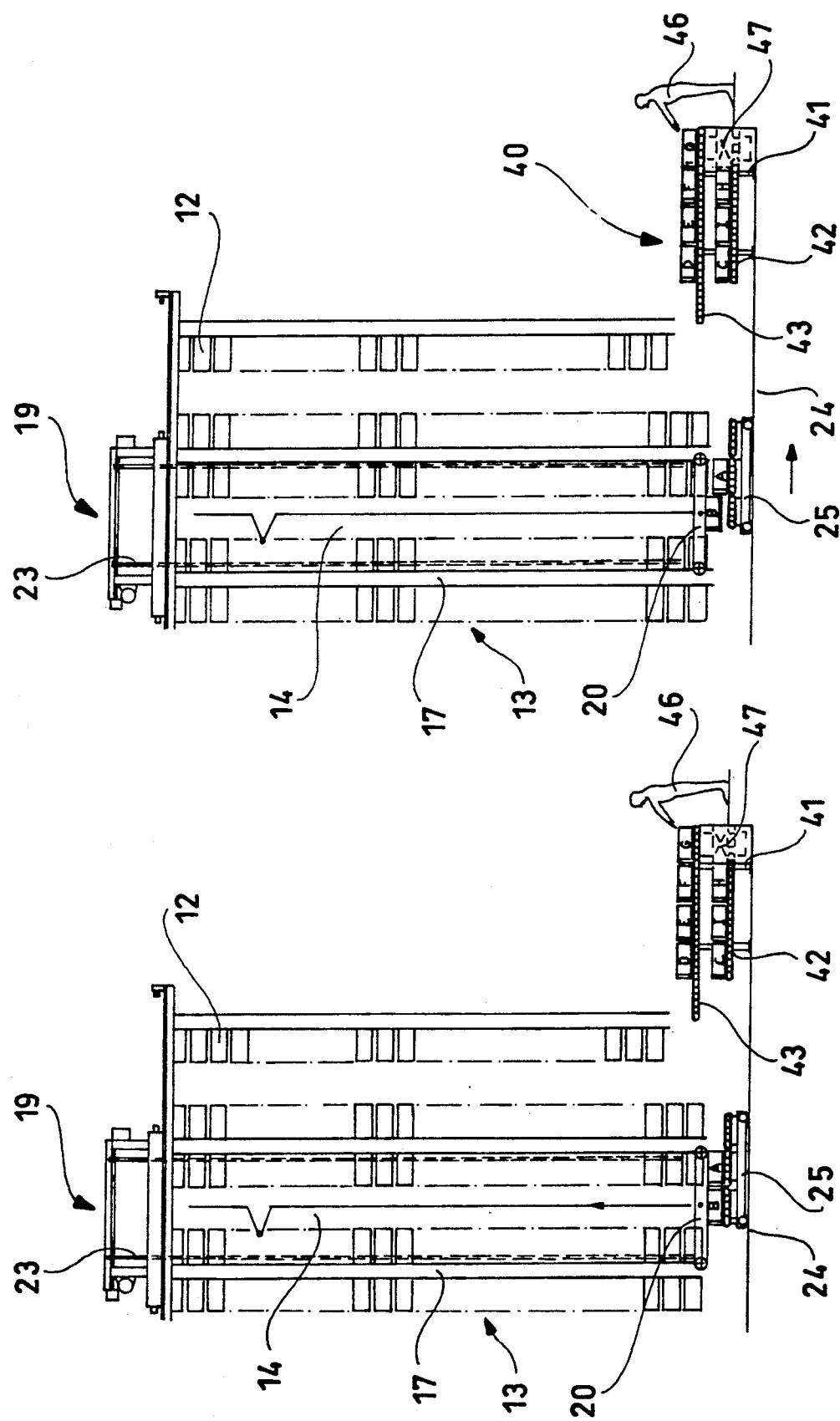

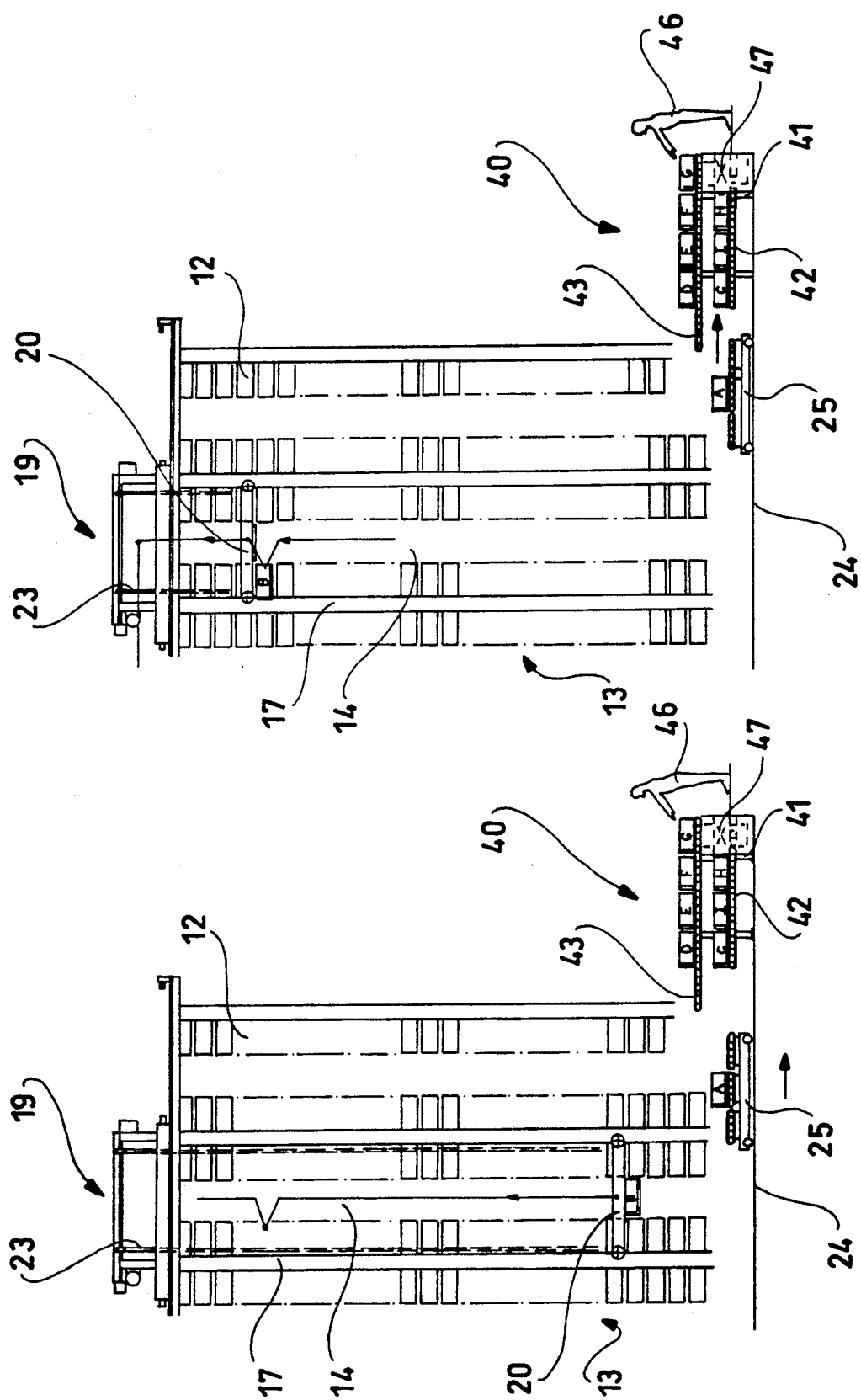

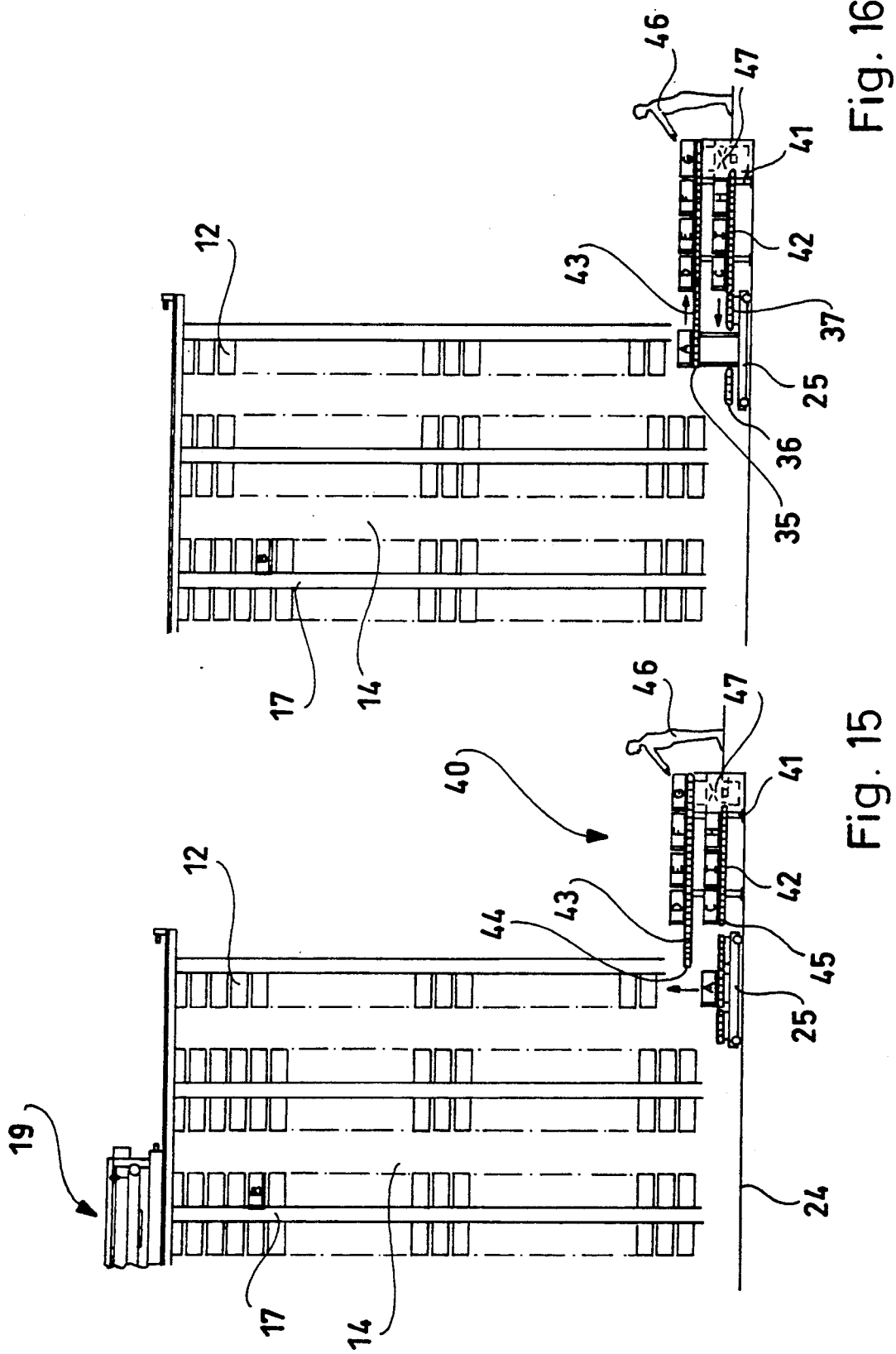

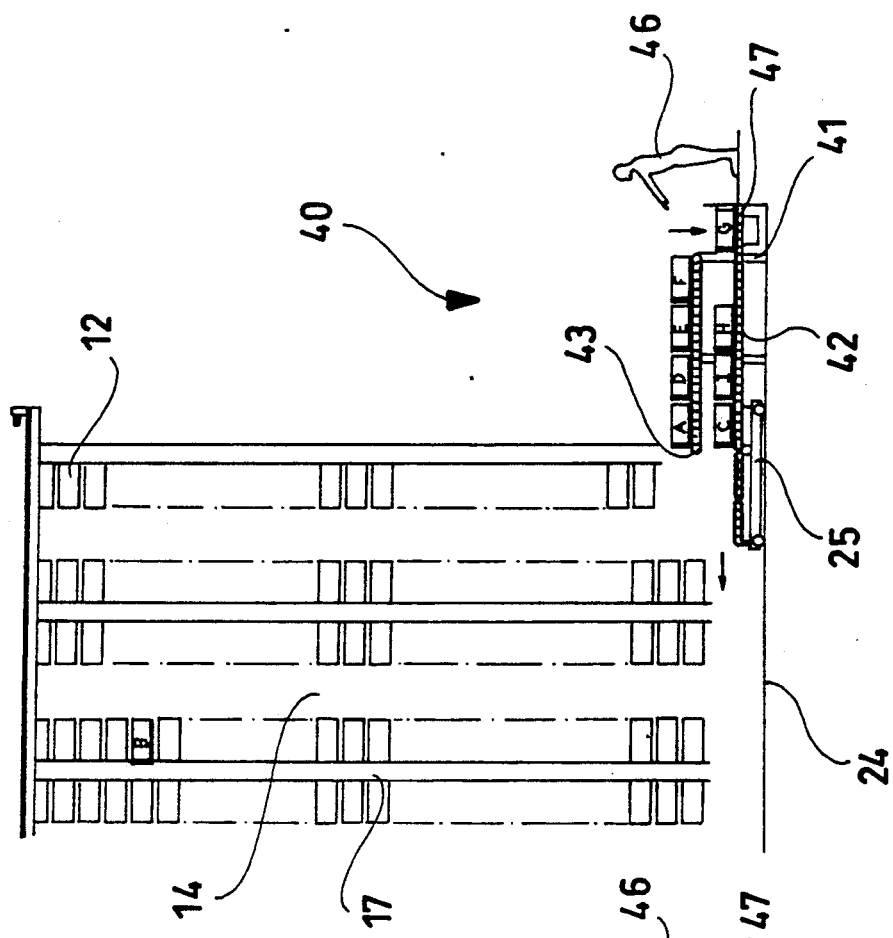
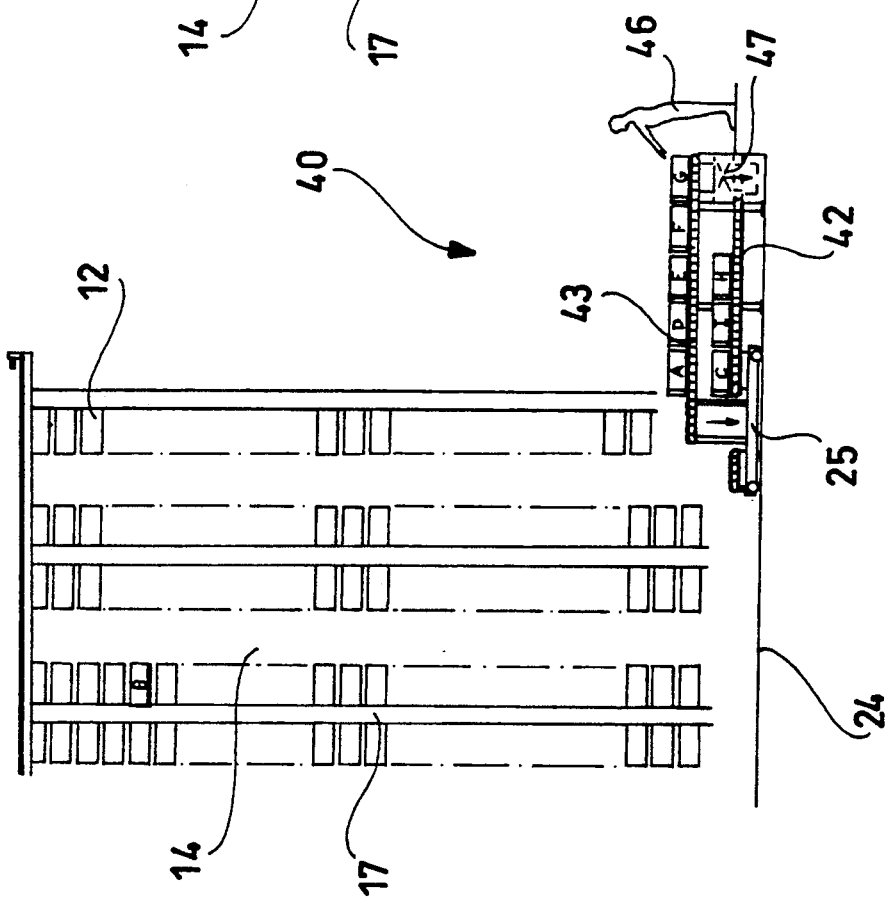

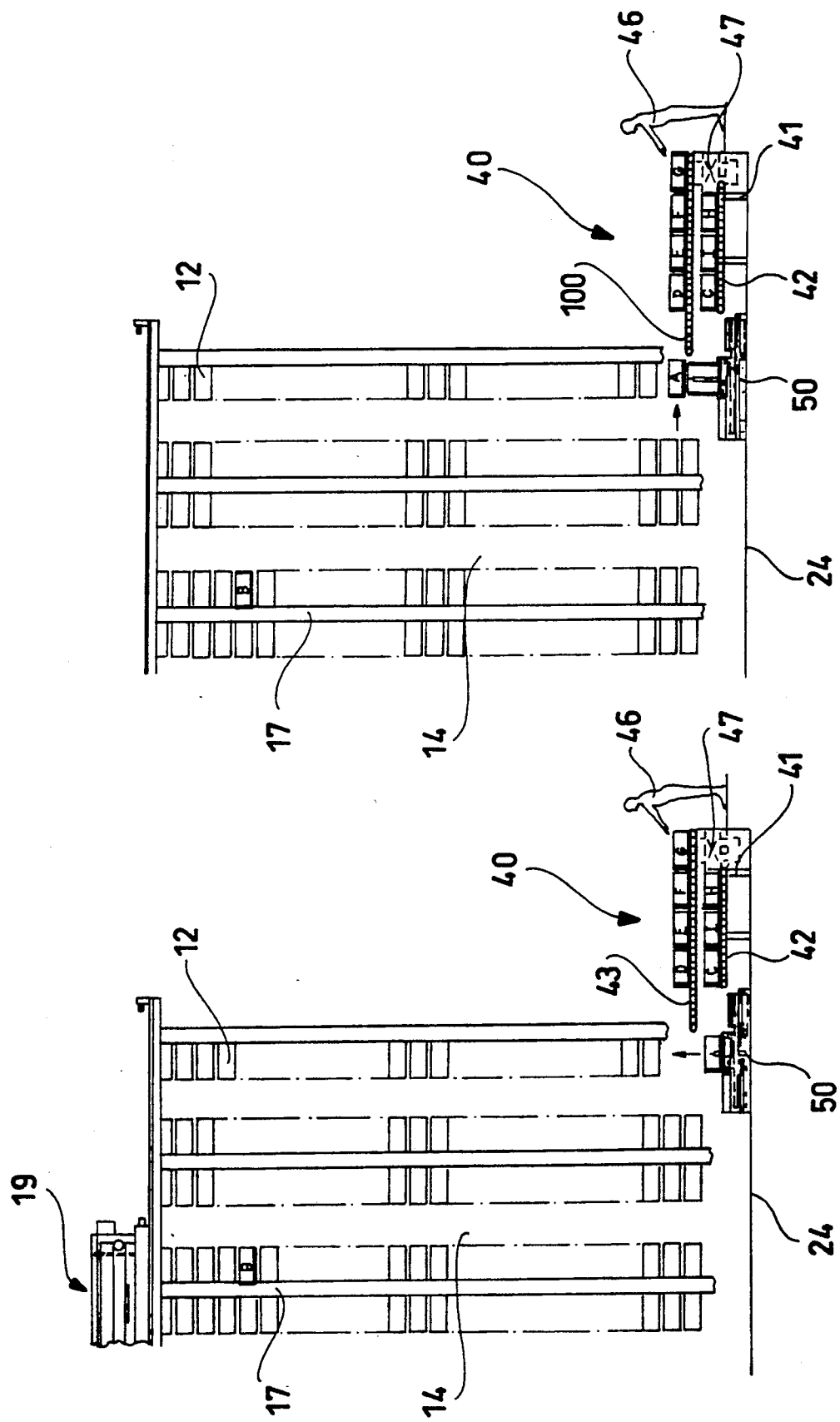

SHELF-TYPE STORAGE, RETRIEVAL AND TRANSFER SYSTEM FOR MATERIAL CONTAINED IN SELF-SUPPORTING STORING PALLET BOXES OR MAGAZINES

Reference to related patent and application, assigned to the assignee of this application, the disclosures of which are hereby incorporated by reference:
U.S. Pat. No. 4,778,325, Stolzer et al.
to which German 36 02 201 corresponds;
U.S. Ser. No. 07/542,911, filed Jun. 25, 1990, Stolzer et al.
Reference to related publication:
German Patent 37 08 401, Dornieden.

FIELD OF THE INVENTION

The invention relates to a shelf-type store or storage system for material in rod or plate form received in self-supporting cassettes or pallet boxes, which are referred to as magazines, with a plurality of shelving units arranged side-by-side in alignment transversely of the longitudinal direction of the material and separated from one another by shelving unit gangways.

BACKGROUND

U.S. application Ser. No. 07/542,911, filed Jun. 25, 1990, Stolzer et al, describes a shelving system in which shelving units have carrier arms secured one above the other on vertical shelving unit supports and extend horizontally transversely of the longitudinal direction of the material. Shelving compartments for the cassettes or pallet boxes or magazines and also for entry into projecting end attachments of the magazines are provided. A shelving service appliance, e.g. a hoist, crane or the like, is displaceable above or laterally of the shelving units transversely of the longitudinal direction of the material. The shelving appliance makes it possible to grasp beneath the carriers of the magazines at the ends and to move the magazines transversely of the shelving gangways and up and down in them. A transport wagon or truck or car is movable beneath the lowermost shelving unit compartments, to shift transversely of the longitudinal direction of the material, with at least two reception places arranged side-by-side for the magazines. At least one transfer and/or utilization station is arranged outside the shelving units in the direction of movement of the transport wagon, car or truck, for placing the material contained in the magazines into and out of store. The station has a first reception plane, corresponding substantially to the level of the transport car, for the exchange of the magazines between the transport car and the station, that is for placing pallet boxes or cassettes into and out of store.

The system described in U.S. patent application Ser. No. 07/542,911, filed Jun. 25, 1990, Stolzer et al, is an improvement over the structure of German Patent 37 08 401. The application describes how the exchange between a magazine to be stored in the shelf-type store on the one hand and a magazine to be brought next in succession out of the shelf-type store, on the other hand, can take place more quickly. For this purpose, as described in said application Ser. No. 07/542,911, the magazines are shifted around on the transport car during its travel between a station for removal from storage and shelf-type store by appropriate means so that at the single meeting point between the transport car and the shelving service appliance it is both possible for the next succeeding magazine to be set down on the transport car and for the returned magazine to be taken off from the transport car in order then to be brought to the place within the shelf-type store from which the magazine to be brought next in succession out of the shelf-type store was taken. This in fact involves a random storage of the magazines which leads to a reduction of the travel times and movements for transport car for the one part and shelf service appliance, e.g. a hoist, crane or the like for the other, necessary for the exchange of magazine to an absolute minimum, with the consequence that both the said apparatus not only cooperate smoothly and harmoniously with one another in the course of the magazine exchange within the travel movements necessary in any case, but also carry out in connection with the magazine exchange only such travel movements as are necessary.

The transfer and/or utilization station for the placing into and out of store or further processing of the material contained in the magazines is arranged in the longitudinal direction of the material beside the shelf-type store so that the magazines are moved from the transport car in the longitudinal direction of the material to this station, for example with the aid of a roller conveyor. If the shelf-type store includes a plurality of blocks lying closely side-by-side in the longitudinal direction of the material, such a station may be available for only one outer shelf unit row, while for the other shelf unit rows, moving the car out of the magazines is possibly only by way of the end sides of the shelf unit rows, which extend transversely of the longitudinal direction of the material.

The system and method described in the referenced application Ser. No. 07/542,911 works well; it has been found in practice, however, that a single transfer location requires relatively more handling time than desirable.

THE INVENTION

It is an object to provide a terminal or transfer station for placing material in self-supporting magazines into and out of store, which station in combination with a transport car as known permits a rapid exchange between at least two magazines. Preferably it should permit an operator possibly with the aid of a buffer zone-to load or unload several available magazines. Basically, the object is to reduce the operation cycling time and to increase the output capacity of the entire shelf-type system.

Briefly, the transfer or terminal station has two reception planes for the magazines, arranged one above the other. The lower reception plane corresponds to the known reception plane. The upper reception plane protrudes beyond the lower reception plane in the direction towards the transport wagon or truck by one magazine width. The transport wagon or car or truck comprises, on the reception place lying to the rear in its direction of travel in relation to the station for putting material into and out of store, a hoist device for lifting the magazine thereon to the level of the upper reception plane. The reception planes and the transport wagon or truck are equipped with means for exchanging the magazines between the reception planes and the transport truck.

With the aid of the hoist device, the transport car can simultaneously deposit a magazine on the upper reception plane and take a magazine from the lower reception plane, with its reception place lying next to it in the direction towards the station for putting into and out of store. Thus in the region of the station for putting into and out of store too, a rapid exchange of magazines is possible between material to be brought out and material to be brought back again into the shelf-type store, without need of further local or travel movement of the transport car for this purpose.

Several magazines may be received transversely of the longitudinal direction of the material on the reception levels of the station for putting into and out of store. The reception planes include means for displacement of the magazines transversely of the longitudinal direction of the material. Thus a greater supply of magazines can be presented on the two reception levels so that the operator active at the station for putting cassettes into and out of store is, at least for a short time, nor dependent upon a single magazine exchange between transport truck and station.

The shifting means of the station for putting into and out of store can be formed by a roller conveyor track or corresponding roller track sections, drivable in both directions of rotation. The magazines can be moved, one at a time, transversely of the longitudinal direction of the material, to the working position of the operator and away therefrom again. The operator can himself determine this procedure according to the working situation, by switching the roller track forward or reverse or OFF.

Alternatively to roller conveyor tracks, other means may be used for the displacement of the magazines transversely of the longitudinal extent of the material. By way of example it may also be advantageous to form the shifting means by a chain conveyor type arrangement, or of corresponding chain conveyor sections, which can be driven in both directions transversely of the longitudinal direction of the material.

Rocker bar conveyors, back-up conveyors, drag chains or the like can be used.

DRAWINGS

FIG. 6 shows an enlarged view of the transport truck after the style of a detail VI in FIG. 2;

FIGS. 7 to 20 show sequential steps in the course of a magazine exchange in a load cycle;

FIGS. 24 to 28 show sequential steps in a magazine exchange in which the transport truck is constructed according to the embodiment of FIGS. 21 and 22.

DETAILED DESCRIPTION

Figure 1:
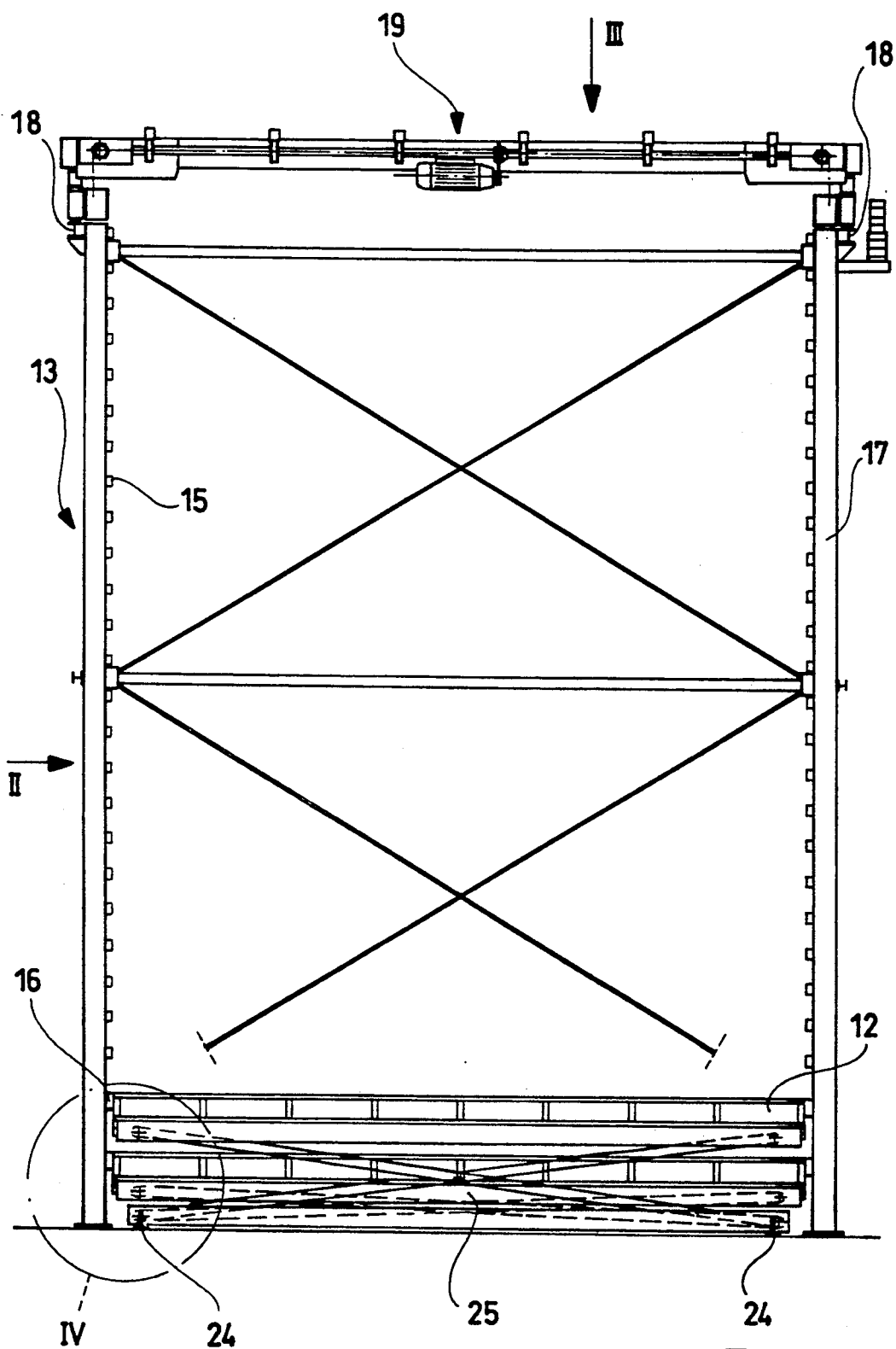
FIG. 1 is a transverse view of a shelf-type store in the direction of the arrow I in FIGS. 2 and 3.
Figure 2:
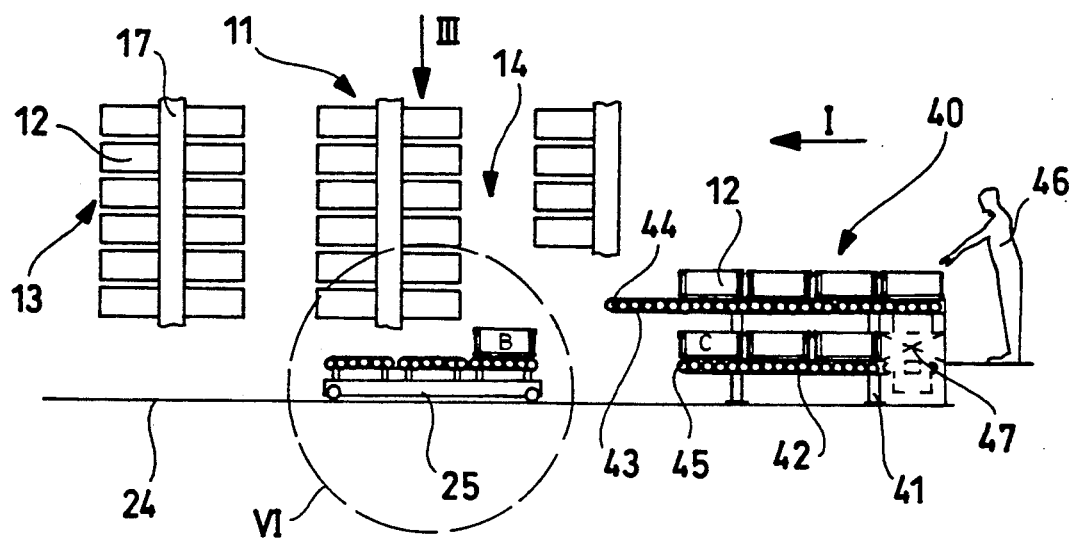
FIG. 2 shows the simplified front view of the shelf-type store in the direction of the arrow II in FIGS. 1 and 3.
Figure 3:
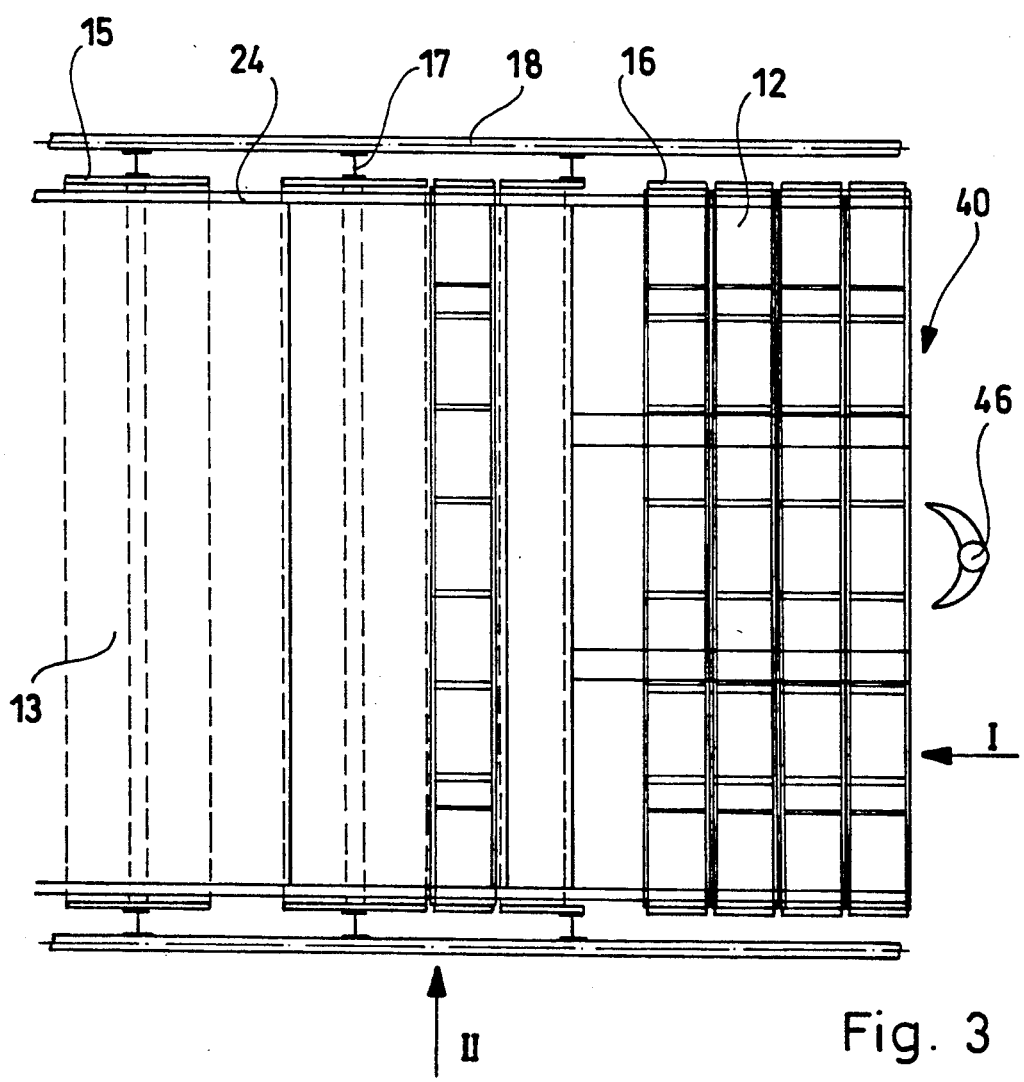
FIG. 3 shows the view of the shelf-type store from above in the direction of the arrow III in FIGS. 1 and 2.

According to FIGS. 1 to 3 a shelf-type store 11 for magazines 12 containing material in rod form consists essentially of shelf units 13 arranged side-by-side transversely of the longitudinal extent of the magazines 12 and separated from one another by shelving unit gangways 14.

The shelf units comprise carrier arms 15 (see also FIG. 23) extending horizontally and transversely of the longitudinal direction of the material into the adjacent shelf gangway in each case, for the construction of shelf unit compartments of the magazines 12, and the magazines may be brought into engagement with the carrier arms 15 by end attachments 16 in the form of a U-shaped section.

This type of magazine storage and formation is known and described individually for example in U.S. Pat. No. 4,778,325, Stolzer et al, to which German 36 02 201 corresponds, the disclosure of which is hereby incorporated by reference.

The carrier arms 15 are secured on end supports 17 of the shelves 13 which are connected with one another at their upper ends externally by track rails 18 for a shelf operator appliance 19. This shelf operator appliance 19 is essentially an overhead crane with a lowerable load beam on each of the two sides of the shelf units (see FIGS. 7 to 14), while load beams 20 are guided through rollers 21 on the shelving supports 17 and in a manner likewise known from DE-A-36 02 201 carry fork-shaped load take-up means 22 which may be brought into engagement with the attachments 16 of the magazines 12. It is self-evident that the load beams 20 arranged on both sides of the shelves 13, which are raisable and lowerable through chains 23 from the crane 19, are synchronised with one another as regards their movements.

A transport truck 25, which is represented in FIGS. 1 and 2 as a whole in transverse and end elevation respectively, but the details of which may better be explained with reference to FIGS. 4 to 6, can be driven under the side-by-side arrangement of shelving units 13 along a track arranged between the shelf supports 17, transversely of the longitudinal extent of the magazines 12.

As may be seen from FIG. 6, the transport truck has a chassis 30 of frame form on which are disposed three reception places 1, 2, 3 for magazines 12. In this case the middle reception place is raisable and lowerable between two levels with the aid, for example, of piston-and-cylinder units 31, 32, the range of stroke being greater than the height of one magazine.

Figure 4:
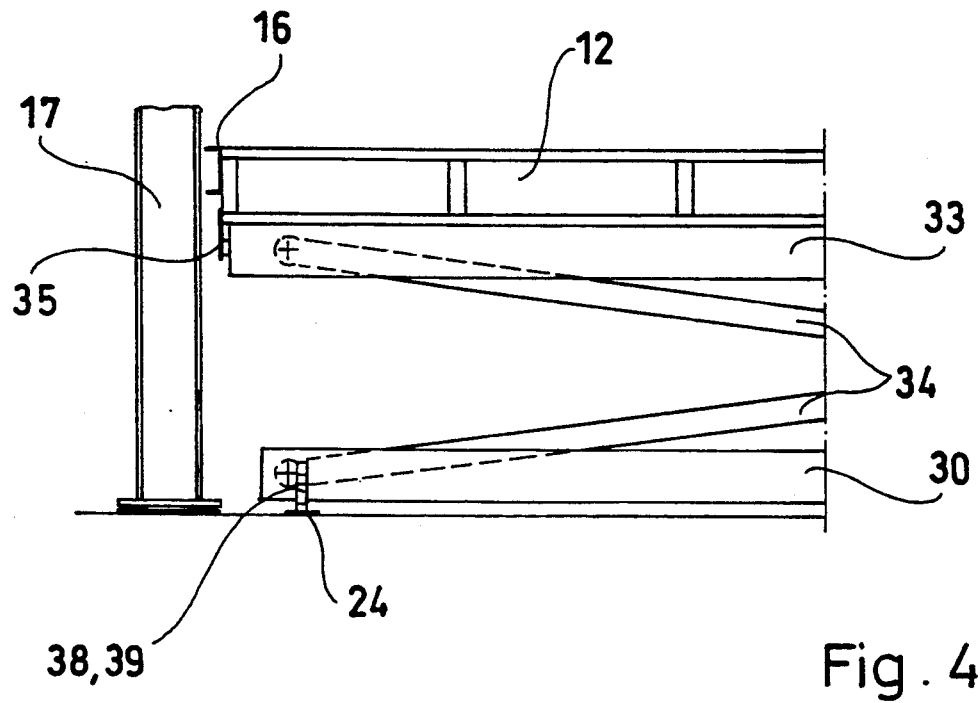
FIG. 4 shows the enlarged partial illustration of the detail IV in FIG. 1.
Figure 5:
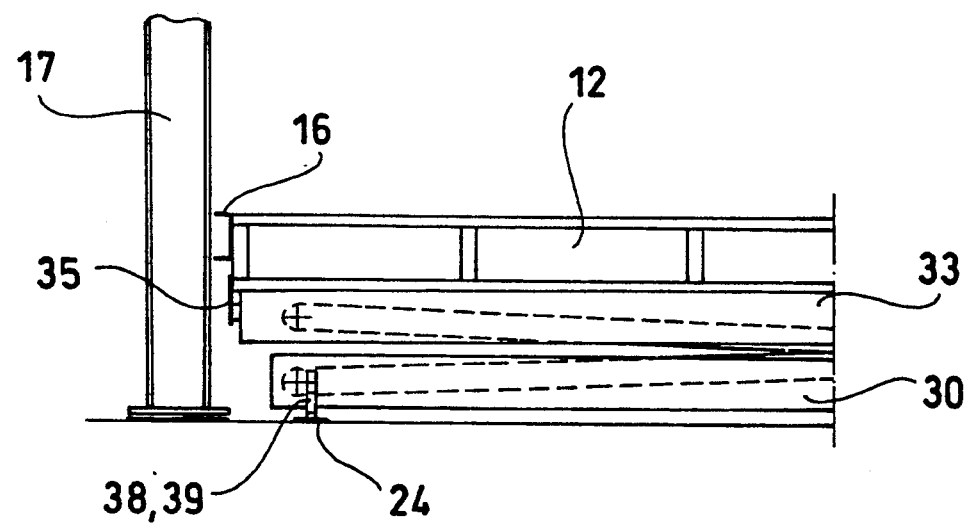
FIG. 5 shows the object according to FIG. 4 in another working position.

FIGS. 4 and 5 show this middle reception place once in the raised and once in the lower position. It may also be seen from these Figures that the reception place is formed essentially from a reception part 33 which is vertically movable in relation to the basic frame or chassis 30 by means of scissor levers 34 which are actuatable in a manner known per se by the piston-and-cylinder units 31, 32 visible in FIG. 6.

At its end the reception part 33 carries rollers 35 by means of which the magazine 12 can be driven transversely of the longitudinal extent of the material in rod form contained in the magazine. The rollers 35 are drivable in rotation in both directions.

Correspondingly, the reception places 2 and 3 also have rollers 36, 37 which can be driven in rotation in both directions so that when the scissor levers 34 are lowered the magazines 12 can be exchanged between the reception places 1, 2 and 3.

It can also be seen from FIG. 6 how the frame 30 of the transport truck is mobile with wheels 38, 39 on the rails 24.

As may be seen in simplified manner from FIG. 2, now the end side of the shelf-type store 11 placed transversely of the longitudinal direction of the material is adjoined by a station, designated as a whole with the numeral 40, for putting the material contained in the magazines 12, which is drivable into position by the transport truck 25, into and out of store. This station has two reception levels 42, 43 arranged one above the other on a frame 41, for the magazines 12, and in this case both reception levels are equipped with roller conveyors 44, 45 drivable in rotation in both directions which correspond to the rollers or roller conveyors 35, 36, 37 of the transport truck 25.

As may be seen from FIG. 2, the upper reception level 43 is longer by one magazine's width in the direction towards the transport truck 25 than is the lower reception level 42 so that the transport truck 25 can drive with its reception place 3 (see FIG. 6) to the lower reception level 42, while at the same time the reception place 1 in its raised position aligns with the reception level 43.

As may further be seen from FIG. 2, the reception levels 42, 43 have space for a plurality of magazines arranged side-by-side. Finally their last magazine place, facing an operator 46, is formed by a lift 47 which is only diagrammatically illustrated, by which magazines may be brought from the upper reception level 43 to the lower reception level 42 and vice versa.

The manner of operation of this apparatus, illustrated as a whole, is now to be explained by reference to FIGS. 7 to 20, each of these Figures showing a shelf-type store in lateral elevation and by way of detail of the illustration in accordance with FIG. 2.

According to FIG. 7 the transport truck 25 brings back a magazine B, which was previously taken from the lower reception level 42 and is standing at the reception place 3 (see FIG. 6) of the transport truck 25, into the shelf-type store 11 in accordance with the direction indicated by an arrow. In this driving movement then, as visible from FIG. 8, the magazine B is transferred from the reception place 3 (considered in FIG. 6) by actuation of the rollers 35 to 37 on to the reception place 32. At the same time the shelf operating appliance 19 takes up a new magazine A from one of the shelf units, by means of the load beams 20 and the load take-up means 22 situated on them.

According to FIG. 9 the transport truck 25 with its middle reception position 1 reaches the foot end of the shelf unit gangway 14 pertaining to the magazine A, whereupon the shelf unit operating appliance 19 in accordance with FIG. 10 sets a fresh magazine A down upon the middle reception place 1 of the transport truck.

Then the transport truck 25 travels according to FIG. 11 by one magazine's width so that the shelf operating appliance 19 can take up the magazine B to be returned to store, by its attachment means 16, as illustrated in FIG. 12.

Now it is possible on the one hand for the magazine B which is to be returned to store to be brought back by the shelf operating appliance 19 to the place which was previously occupied by the magazine A.

On the other hand, the transport car can now travel with the magazine A to the station 40, as may be seen from FIG. 14, which it then reaches in the position shown in FIG. 15. There, in accordance with FIG. 16, the magazine A is lifted by actuation of the scissor levers 34 according to FIGS. 4 and 5 to the level of the upper reception level 43 in order to be brought over by actuation of the rollers 35, for the one part, and the roller track 44, for the other part, from the transport car on to the upper reception level. At the same time, however, a next magazine C already processed at the station is brought over from the lower reception level 42 by actuation of the roller tracks 45 and the rollers 37, on to the reception place 3 of the transport truck 35, as shown by FIG. 16.

Now the reception place 1 according to FIG. 17 is lowered again and according to FIG. 18 the transport truck can travel down into the shelf-type store for the next cycle.

Figure 20:
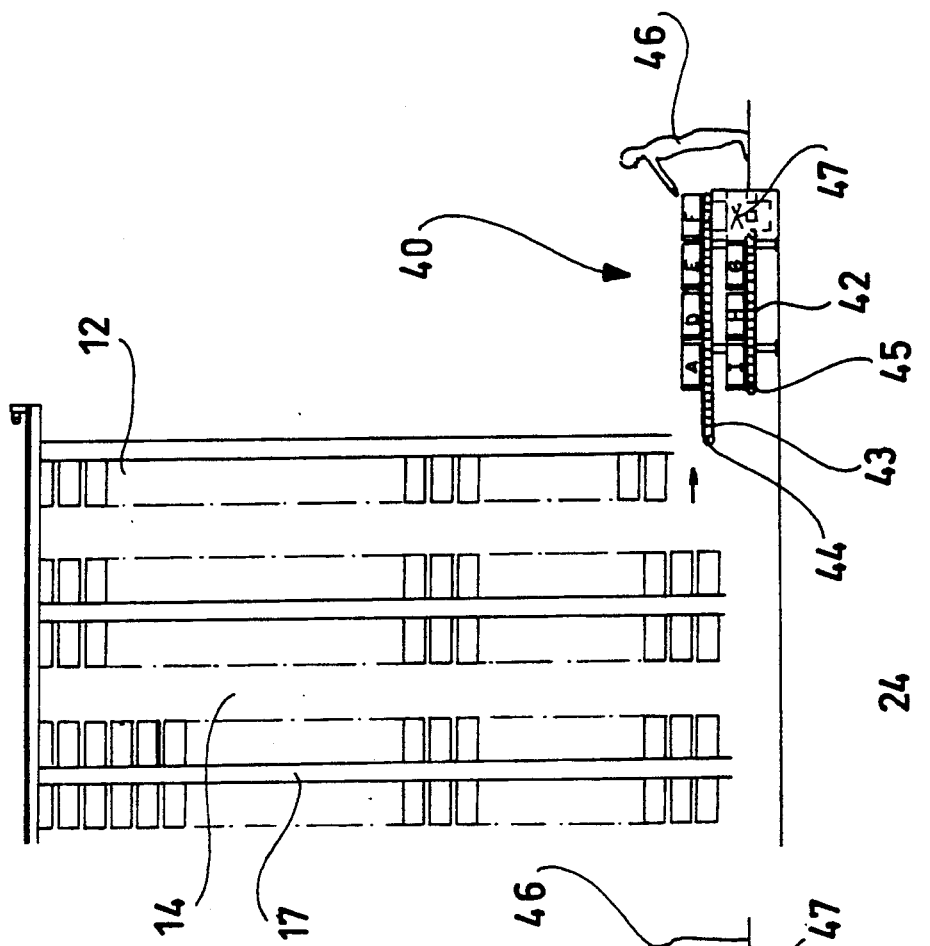
Figure 19:
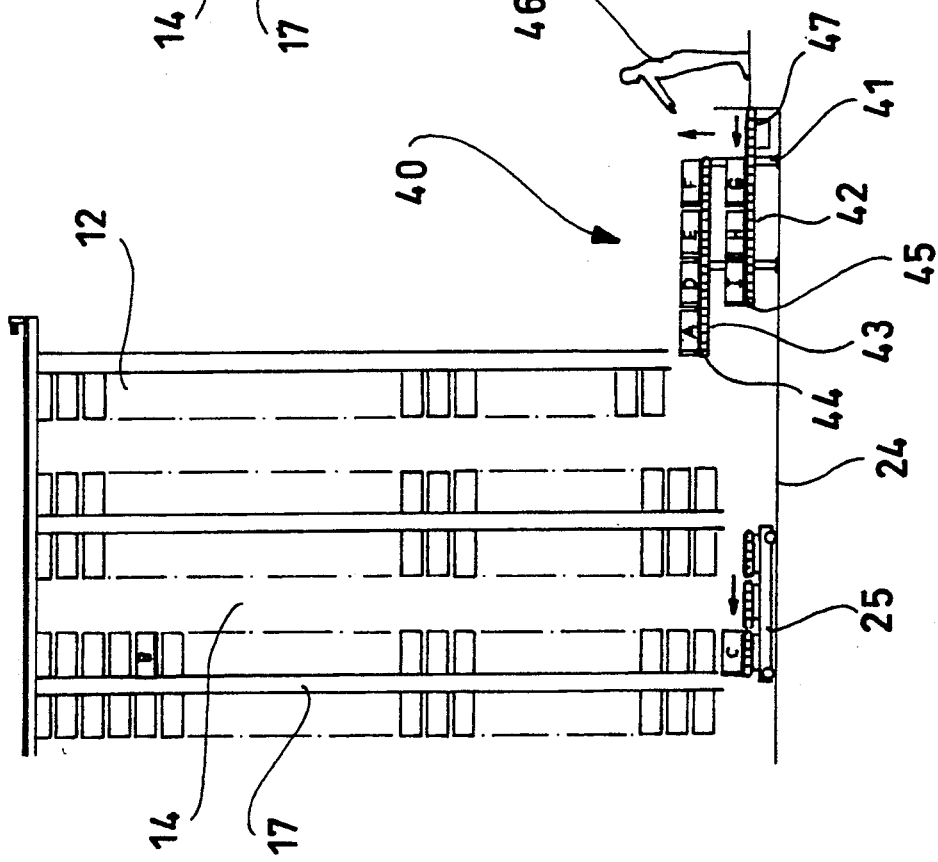

During a next magazine exchange in the region of the transport truck, which is merely indicated in FIGS. 19 and 20, a magazine G used up according to FIG. 17 can be lowered in the manner visible in FIG. 18 by the lift 47 to the lower reception level 42, as illustrated in FIG. 18. Then by operation of the roller track 45 the magazine G is taken down by the lift on to the lower reception level, in the manner visible from FIG. 19. Now the lift 47 travels upwardly again so that the next succeeding magazines of the upper reception level can be shifted to follow by operation of the roller conveyor 44. As a result, then, according to FIG. 20 on the lower reception level the next succeeding magazine I is available for return into the shelf-type store, while on the upper reception level a place is free for the magazine to be fed next to the station 40.

Thus, as may be seen, the magazine exchange between transport truck 25 and station 40 takes place in one short working action, without the transport truck 25 having to be additionally driven for this purpose. Thus this magazine exchange corresponds only to the short expenditure of time that was also necessary according to FIGS. 7 to 12 within the shelf-type store.

The apparatus as described hitherto is directed to shelf unit rows which are merely provided on their ends, placed transversely of the material longitudinal direction, with a station for putting the material contained in the magazines into and out of store.

In the case of a plurality of such shelf unit rows arranged side-by-side, however, the possibility known per se also exists for an outer shelf unit row of arranging a station for removal from storage beside the shelf unit row in the longitudinal direction of the material. In order to cover this practical case also for the transport truck, a construction and manner of operation are foreseen such as will be explained in detail below by reference to FIGS. 21 to 28.

Figure 21:
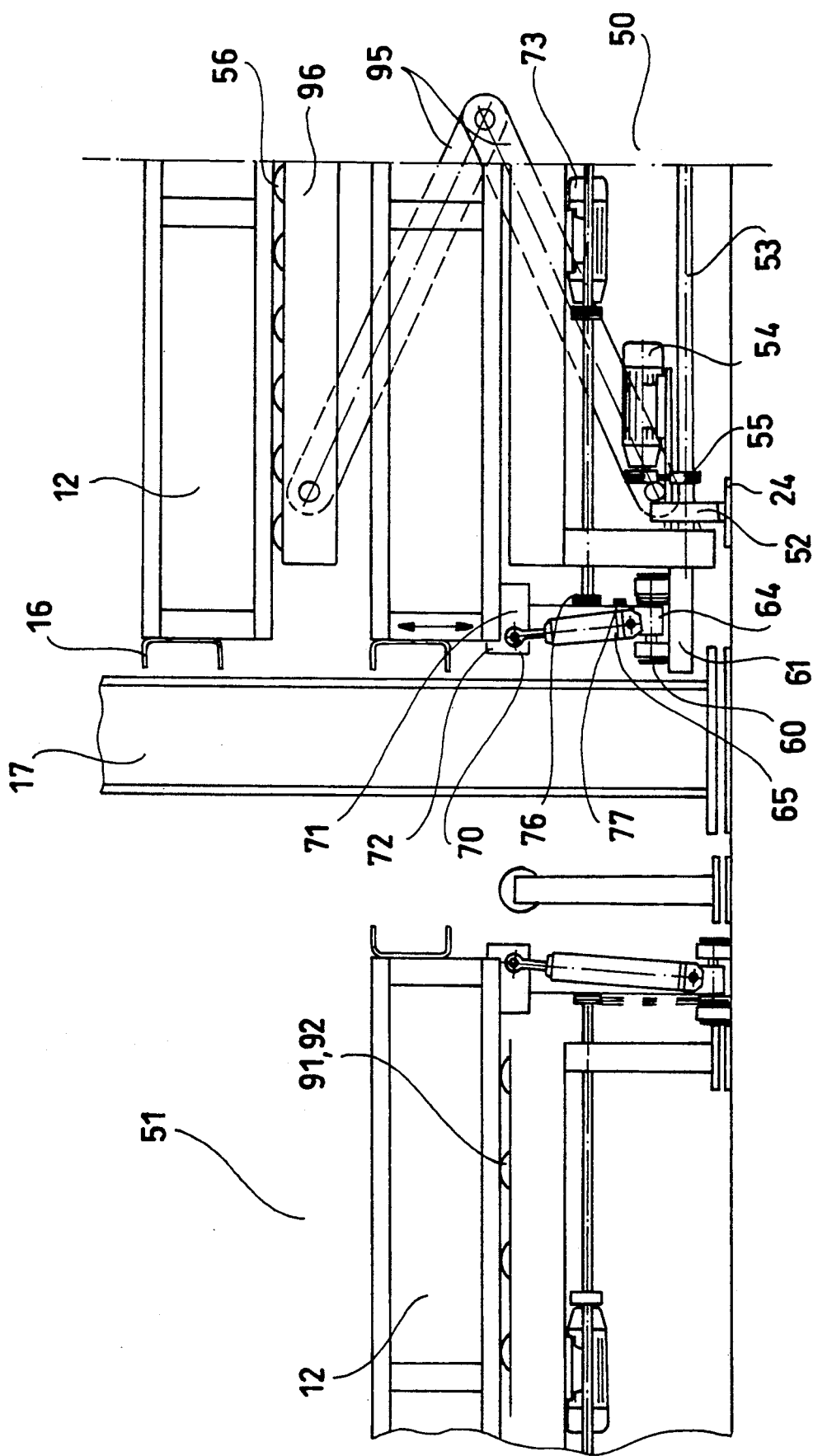
FIG. 21 shows another embodiment of the invention in the illustration according to the detail IV according to FIG. 1.

Thus FIG. 21 shows, in a manner corresponding to the detail illustration IV according to FIG. 1, a transport truck designated generally with the numeral 50 which can co-operate with a station 51 for removal from storage which is arranged in the longitudinal direction of the material beside the shelf row 11. (In this connection see also FIG. 23.) For this purpose the transport truck 50 is formed as follows, in the manner that may be seen especially in FIGS. 21 and 22.

The transport truck 50 is displaceable on the already mentioned rails 24 with the aid of wheels 52, of which at least one pair is synchronised by a shaft 53, through which the propulsion 55 also takes place with the aid of a motor 54. However, the drive could equally well take place in known manner on both sides of the transport truck by its own motor on each side, the motors being synchronised with one another with regard to the driving movements.

Figure 22:
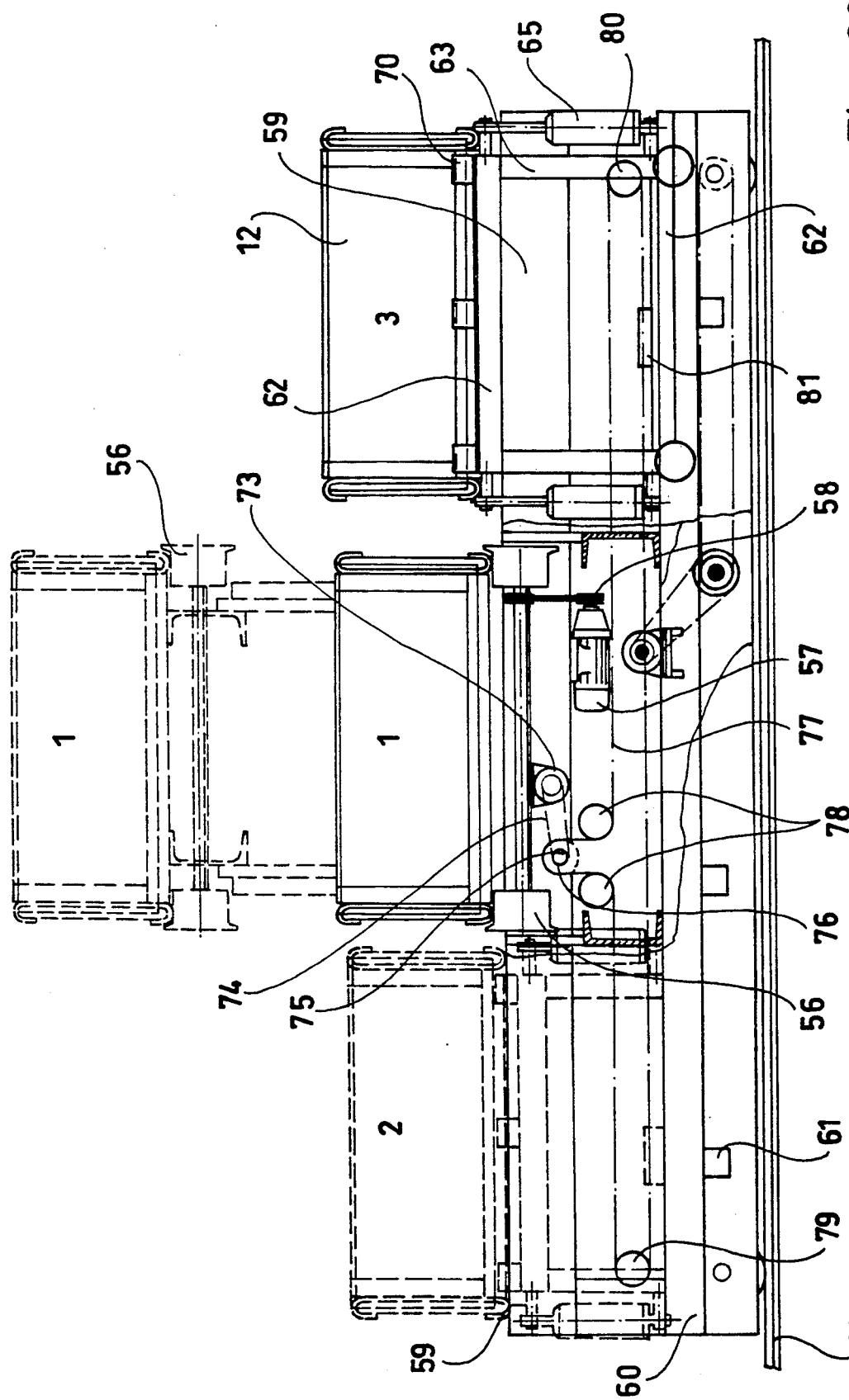
FIG. 22 shows an end view of the transport truck as visible from FIG. 21, similar to the view VI FIG. 2.

As may best be seen from FIG. 22, transversely of the longitudinal direction of the magazines 12 three juxtaposed magazine positions 1, 2, 3 are formed on the transport car 50, the middle magazine position 1 consisting of a roller conveyor with rollers 56 which can be driven in both directions of rotation with the aid of a motor 57 through a drive connection 58.

The other two positions 2 and 3 are basically given by a corresponding standing surface of the transport car 50 for the magazines 12 which, as may best be seen from FIG. 21, are given by beams 59 transverse to the longitudinal direction of the magazines.

In the region of the two ends of the magazines 12, the transport car 50 also includes outer rails 60 carried by ribs 61 fast with the frame, over which carriages 62 of a transfer device for the magazines are mobile on the transport car 50 transversely of the longitudinal extent of the magazines. In this case the carriages 62 of the transfer device are in connection through vertical stands 63 of variable length with drive mechanisms 64 movable on the outer rails 60, and are vertically displaceable by way of a piston-and-cylinder unit 65 each of which is pivotably articulated to the upper side of the carriage 62 on the one hand, and in the region of the drive mechanism 64 in each case, on the other.

As may be seen from FIGS. 21 and 22, both sides of the carriages 62 also include supporting angle pieces 70 allocated to the two ends of the magazine 12 in each case, for the placing into store and the longitudinal and possibly transverse adjustment of the magazine concerned, of which angle pieces the horizontal arm 71 engages beneath the magazine, while the vertical arm 72 is the abutment against the magazine end wall. Here for collison-free handling the vertical arm 72 of the supporting angle piece 70 may expediently be inclined or bevelled away from the magazine end wall in the region of its upper free end.

As may be seen from the description given so far of the details of the transport truck 50, on it in each case a magazine 12 can be set to and from between the positions 1, 2 and 3 with the aid of the transfer device (carriage 62), in that by the action of the piston-and-cylinder units 65 the respective magazine is lifted and driven by the drive of the drive mechanisms 64 along the outer rails 60. FIGS. 21 and 22 also show the synchronous reciprocating drive of the carriages 62 by way of a motor 73 secured on the transport truck 50 and driving a shaft 75 through a chain 74; over the end spur gears 76 of said shaft, at both ends of the transport truck, an endless chain 77 circulates, which is guided by means of reversing wheels 78, 79, 80 and is secured by its lower, horizontally continuous run by a coupling 81 to the carriage 62.

As may be seen from FIG. 21, in the shelf-type store on one outer side a de-storage station 51 is arranged. This, as shown by the plan view according to FIG. 23, comprises two places 90, 91 side-by-side, which are formed as roller tracks running in the longitudinal direction of the material. The transport truck 50 can deliver a magazine 12 from its middle reception place 1 on to one of these roller tracks, in that the rollers 56 of this reception place are appropriately driven by the motor 57.

Moreover, as in the example according to FIGS. 1 to 6, the middle reception place 1 is displaceable in height by scissor levers 95 which are articulated for the one part to a frame 96 carrying the rollers 56 and for the other part to the frame 59 of the transport truck 50. The scissor levers are again actuatable in a manner known per se, for example by a piston-and-cylinder unit (not shown here). The frame 96 has a shortened size in the longitudinal direction of the material or of the magazines 12 so that the ends of the magazines 12 which comprise the attachments 16 can project freely. On the one hand, this is in order that the carriages 62 forming the transfer device can travel freely past the frame 96.

On the other hand, however, this is also in order that a station of the kind as already described earlier can take up the magazines with its roller conveyors.

Figure 23:
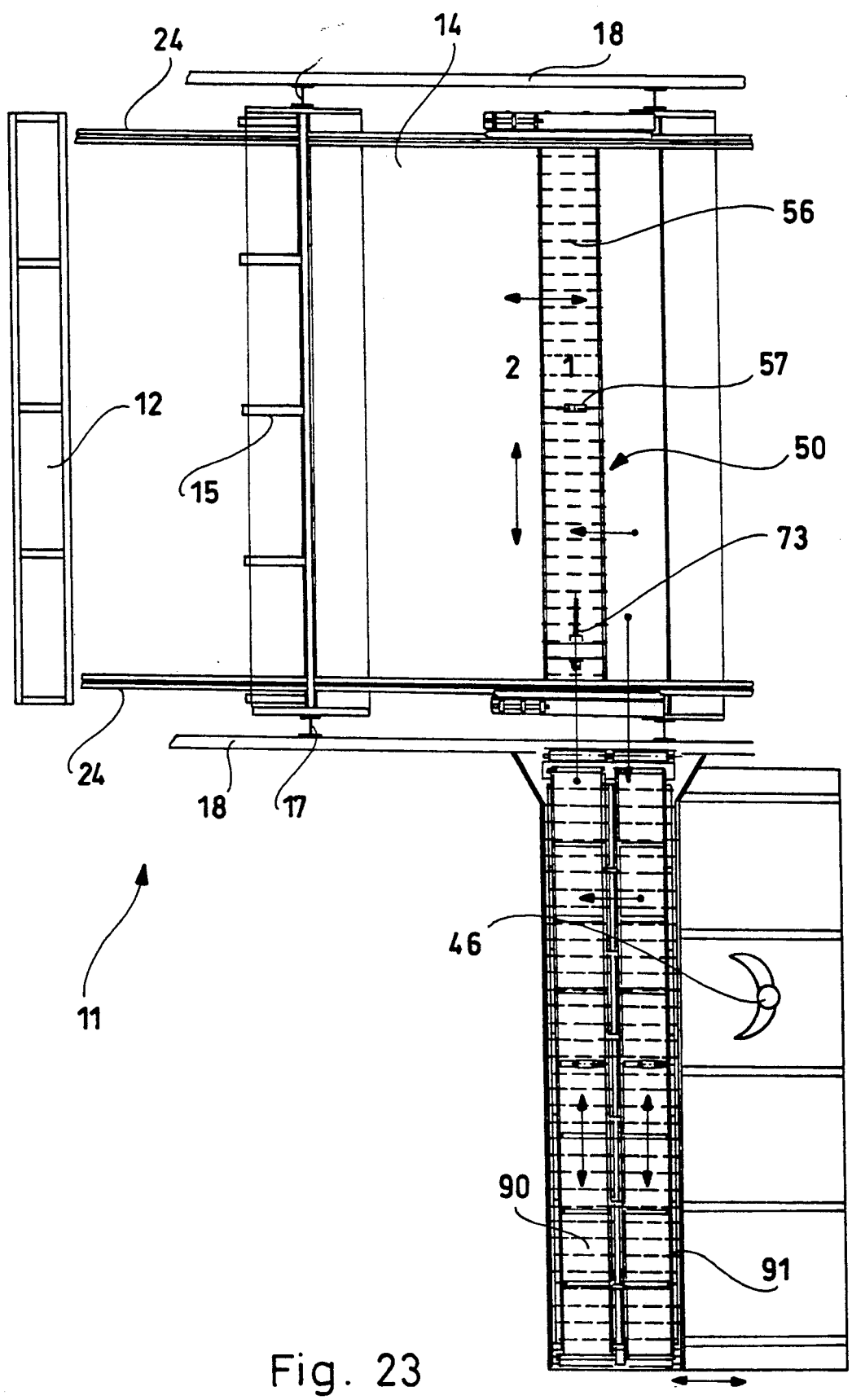
FIG. 23 shows a plan view of an apparatus according to FIG. 21.

In this connection and with regard to the manner of operation of the station for putting material into and out of store, in combination with the transport truck explained with reference to FIGS. 21 to 23, reference is made to FIGS. 24 to 28. Here one should imagine that the transport truck, in the manner as already described with reference to FIGS. 7 to 15, has already brought a new magazine A in the direction towards the station for putting into and out of store.

Figure 26:
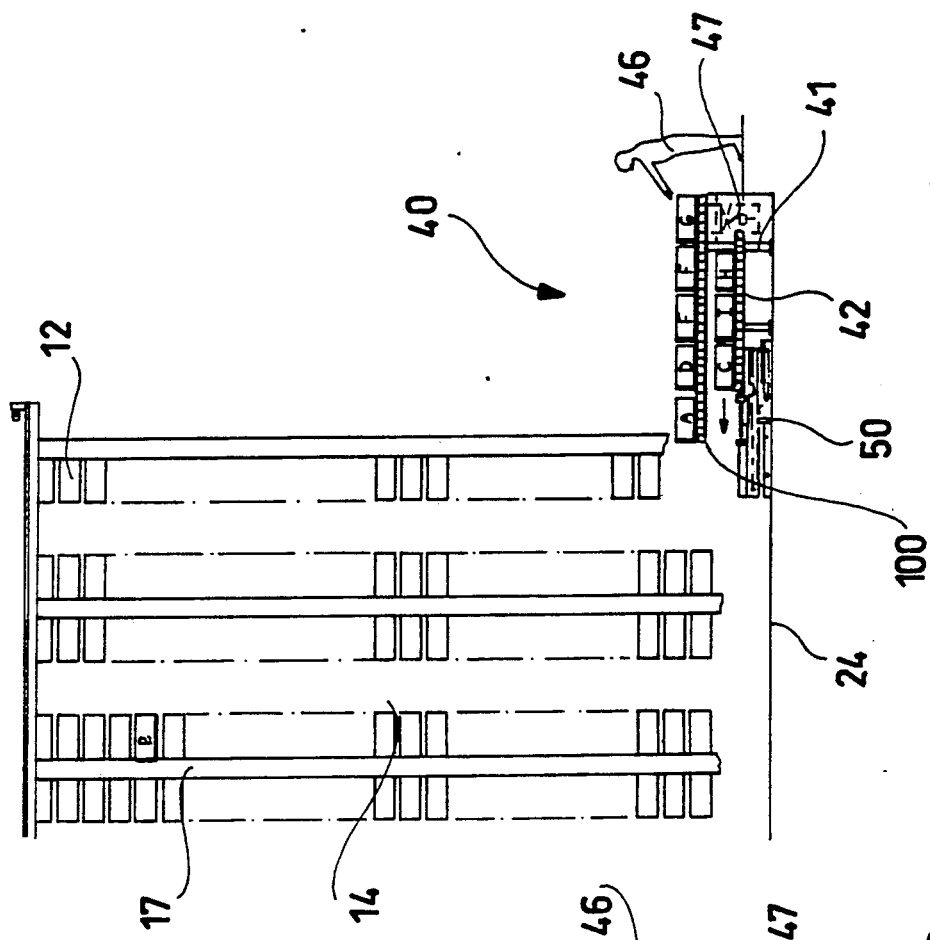
Figure 27:
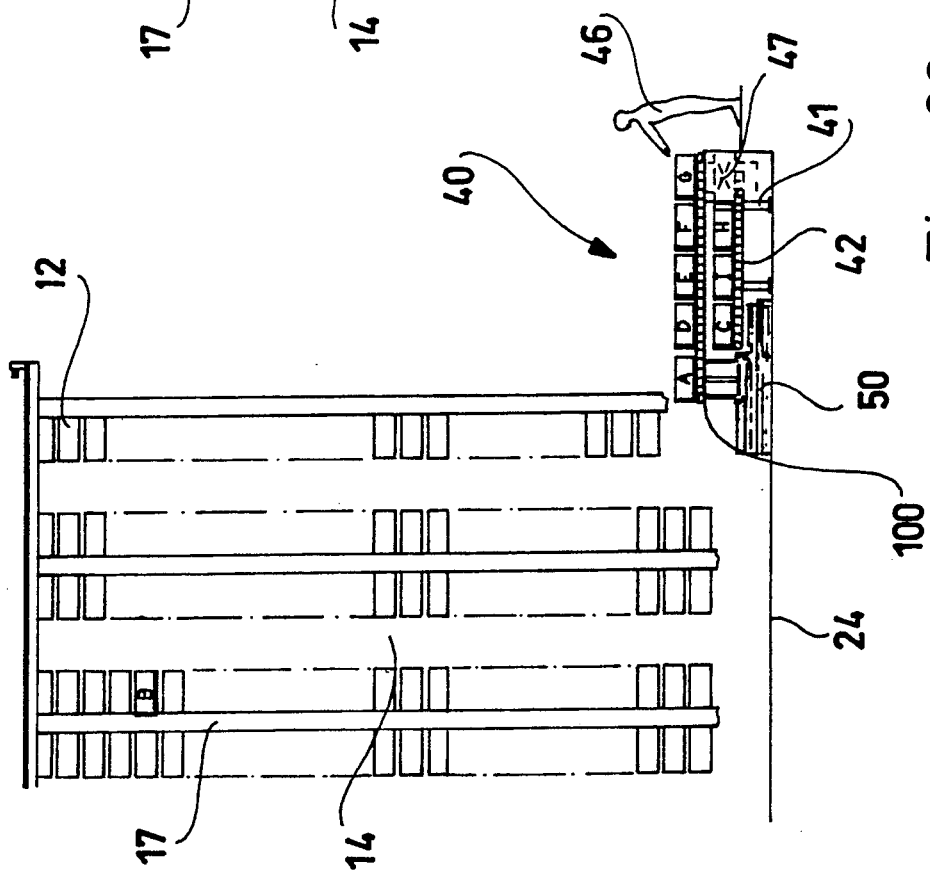

Now shortly before the station 40 is reached the frame 96 with the magazine A situated thereon is lifted into the position seen in FIG. 25, whereafter it can then be driven into the position seen in FIG. 26. The construction of the roller conveyor 100 of the upper reception level 43 is here made, at least on the left-hand first place, so that the frame 96 can drive in between the rollers 100, thus these rollers support the respective magazine only at its two longitudinal ends. In other words, at least the forward position, facing the transport truck, of the upper reception level 43 of the station 40 is constructed in an open fork form in the direction of the shelf units so that the frame 96 can drive in between the prongs of the fork.

If now this has taken place in the manner seen in FIGS. 25 and 26, then by lowering of the frame 96 the magazine A is set down on the upper reception level 43. At the same time the transfer device described with reference to FIGS. 21 and 22 can lift a magazine C for return from the lower reception level 42 of the station 40, and here the roller conveyor 45 of the lower reception level, seen in the longitudinal direction of the material, must lie within the region occupied by the supporting angle pieces 72. Thus here the ends of the magazines must protrude freely to the exterior over the roller conveyor 45 in order to be able to be grasped by the transfer device or its angle piece 72.

Figure 28:
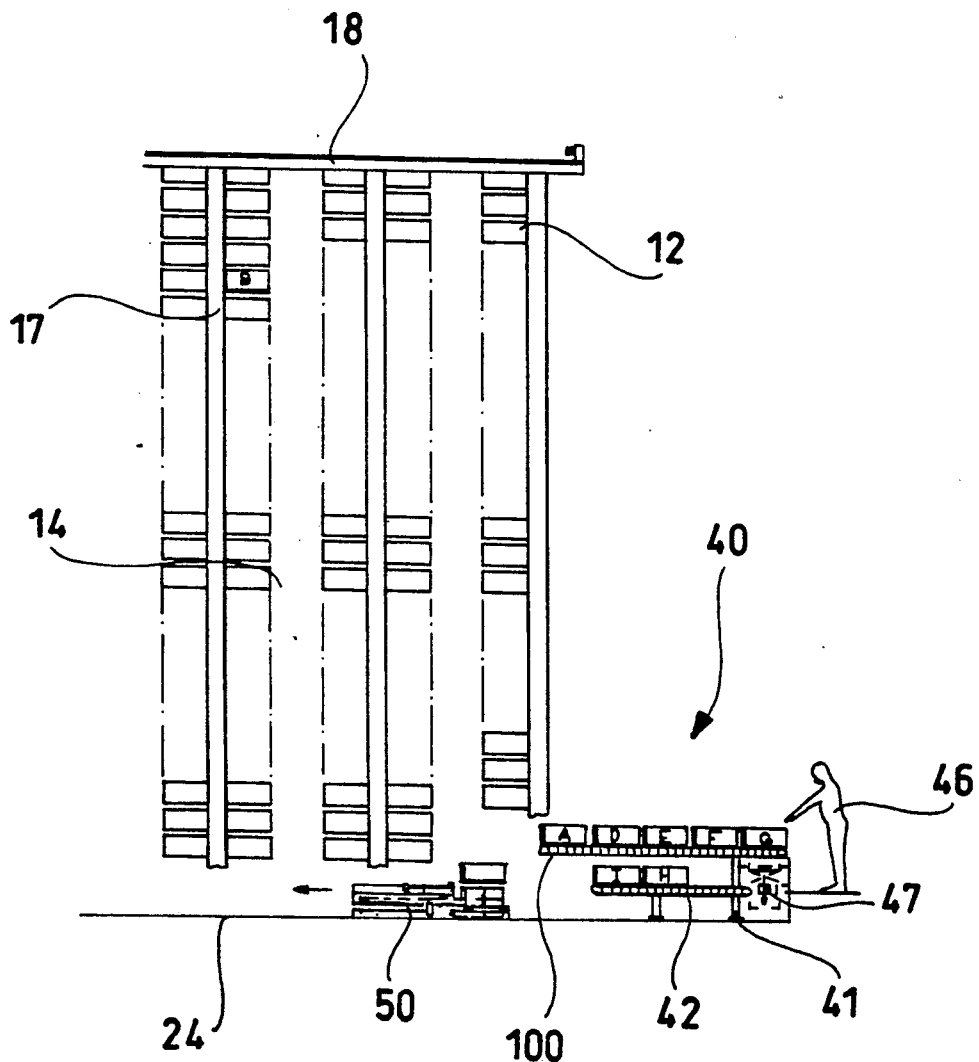

If then the transport car 50 has taken the magazine C from the lower reception level of the station 40, then the further working operation takes place again with the driving of the transport car into the shelf-type store according to FIG. 28, whereupon in corresponding manner the course of work according to FIGS. 7 to 12 follows, but with the difference that the transfer of the magazine does not take place in the manner as described there by way of roller conveyors situated on the transport car, but rather by way of the transfer device described with reference to FIGS. 21 and 22.

The last magazine place at the end of the reception levels remote from the transport truck is preferably formed by a vertically mobile lift common to both levels, for the exchange of the magazines between the two reception levels of the station for putting the magazines into and out of store. The actuation of this lift is independent of the driving movements of the transport truck and can be effected by the operator according to the working situation.

The transport truck preferably has a hoist device of the transport truck which includes rollers drivable in rotation in both directions for magazine exchange between the hoist device and the upper reception level or in relation to a neighbouring reception place of the transport truck. Here the hoist device may include a horizontally extending reception part which substantially corresponds to the external contour of the reception place of the transport truck and which is raisable and lowerable in relation to the transport truck through hoist means. Here the reception part may include the rollers drivable in both directions for magazine exchange, at its ends associated with the longitudinal ends of the magazines.

As regards the construction of the hoist device, this or the said reception part, as the case may be, can be vertically displaceably articulated through displaceable scissor levers on the transport truck, and the vertical displacement of the scissor levers can take place in a manner known per se, for example through piston-and-cylinder units, setting spindles or the like.

Correspondingly, each of the reception places of the transport truck, adjacent to the hoist device, may likewise include rollers drivable in rotation in both directions, for the magazine exchange.

Another construction of the transport car may be designed so that a transfer device is arranged on the transport car and is movable transversely of the longitudinal direction of the material, for the lifting and transference of a magazine situated on a reception place of the transport car, to another reception place of the transport car, or for taking a magazine from the associated end of the lower reception level of the station for putting into and out of store on to the corresponding reception place of the transport car. Thus here the transfer device is the equivalent of the above-mentioned rotationally drivable rollers.

The transfer device may be constructed such that it includes at the longitudinal ends of the magazines, a respective carriage displaceable along outer rails of the transport car, for the reception of a magazine. Here each carriage may be in connection through vertical stands of variable length with drive mechanisms movable on the outer rails and may be displaceable in height by means of piston-and-cylinder units which are pivotably articulated to the carriage on the one hand and in the region of the drive mechanisms, on the other.

Here each carriage may include supporting angle pieces allocated to the two ends of the magazine, for the storage and longitudinal or transverse adjustment of the magazine, the horizontal arm of the angle pieces engaging beneath the magazine, while the vertical arm is in abutment against the end wall or side wall of the magazine.

The vertical arm of the supporting angle pieces may be bevelled off in the region of its free end with an inclination away from the magazine end wall or side wall, in order to render possible easier compensation of any offset of the magazines.

For the case of an outer shelving row, where a station should optionally be provided for putting into and out of store, which station is arranged in the longitudinal direction of the material beside the shelving units at the level of the transport car for the simultaneous reception of two magazines arranged side-by-side, in amplification of the embodiments stated above it may be advantageous for the reception place of the transport car including the hoist device to include also means effective when the hoist device is in the lowered position for the exchange of a magazine between the station for putting into or out of storage and transport truck. These means may, for example, be formed by a roller track drivable in rotation in both directions.

For the use of this design, expediently the reception place including the hoist device may be driven in between conveyor means of the upper reception level, which lie outwards in relation to the hoist device and the longitudinal direction of the material, from the end of these means facing the shelves.

In the foregoing, reference has been made in each case to only one station for putting the material contained in the magazines into and out of store. Nevertheless, of course, the invention also covers the possibility of providing such stations at both ends of the travel path of the transport car.

Various changes and modifications may be made, and any features described herein may be used with any of the others with the scope of the inventive concept.

I claim:

1. Shelf-type storage system for elongated material accomodated in self-supporting magazines of a given width, said magazines having projecting end attachments, said store system comprising:

a plurality of shelving units arranged side-by-side in alignment along a horizontal transverse direction and perpendicular to a horizontal longitudinal direction, and separated from one another by shelving unit gangways, said elongated material being generally parallel to said longitudinal direction when in said magazine, said shelving units including carrier arms secured one above another on vertical shelving unit supports and extending horizontally in said transverse direction into an adjacent shelving unit gangway, for the formation of shelving unit compartments for the magazines and also for engagement in said projecting end attachments of the magazines;

load transport means displaceable in said transverse direction, and operatively engageable with the magazines for moving said magazines transversely, upwardly and downwardly, with respect to the shelving unit gangways;

a transport wagon (25, 50) displaceable in said transverse direction and beneath a lowermost shelving unit compartment and being formed with at least two side-by-side reception places at a first height for the magazines;

at least one temporary storage station (40), arranged outside the shelving units with respect to the direction of travel of the transport wagon, and approachable at a first side by the transport wagon, this temporary storage station including a first lower reception level (42) substantially corresponding to the first height of the transport wagon for the exchange of the magazines between the transport wagon and the temporary storage station, said temporary storage station (40) including a second upper reception level (43, 100) projecting beyond the lower reception level (42) by one magazine width at said first side corresponding to the side approached by the transport wagon;

said transport wagon (25, 50) including a lifting device (33, 34, 95) for lifting a magazine that is present on the wagon to the height of the upper reception level; and said upper and lower reception levels (42, 43, 100) and the transport wagon (25, 50) each including magazine exchange means for exchanging the magazines between the upper and lower reception levels and the transport wagon.

2. Shelf-type storage system according to claim 1, wherein several magazines (12) may be received on the lower and upper reception levels (42, 43, 100) of the temporary station (40) along said transverse direction, and wherein the lower and upper reception levels include means for the displacement of the magazines along said transverse direction.

3. Shelf-type storage system according to claim 2, wherein the displacement means are formed by a roller track (44, 45) drivable in both directions of rotation.

4. Shelf-type storage system according to claim 2, wherein the displacement means are formed by a chain conveyor, which can be driven in both directions along said transverse direction.

5. Shelf-type storage system according to claim 2, further comprising a vertically movable lift (47) located at an end of said lower reception level remote from the transport wagon, said lift being operable to exchange magazines between the lower and upper reception levels.

6. Shelf-type storage system according to claim 1, wherein the magazine exchange means includes rollers (35) drivable in rotation in both directions operatively associated with the lifting device (33, 34) of the transport wagon (25), for magazine exchange between the lifting device and each of the upper reception levels.

7. Shelf-type storage system according to claim 6, wherein the lifting device comprises a horizontally extending reception part (33) substantially corresponding to an external contour of one of said reception places on said transport wagon, and wherein the lifting device is provided for raising or lowering the reception part in relation to the transport wagon (25).

8. Shelf-type storage system according to claim 7, wherein the reception part (33) comprises rollers (35) drivable in both directions of rotation, for exchanging magazines.

9. Shelf-type storage system according to claim 7, wherein the lifting device further comprises vertically displaceable scissor levers (34) coupling the reception part (33) to the transport wagon.

10. Shelf-type storage system according to claim 9, further comprising positioning means coupled to the scissor levers for vertical displacement of the scissor levers (34).

11. Shelf-type storage system according to claim 6, further comprising local rollers (36, 37) which can be driven in rotation in both directions, for the exchange of magazines, located at each of the reception places (2, 3) on the transport wagon and positioned adjacent to the lifting device.

12. Shelf-type storage system according to claim 1, further comprising a transfer device (60-71) arranged on the transport wagon (50), said transfer device being movable along said transverse direction for lifting and transferring a magazine (12), selectively disposed at a predetermined reception place (1, 2, 3) of the transport wagon (50) to another reception place of the transport wagon or for transferring a magazine from an associated end of the lower reception level (42) of the temporary storage station (40) onto a corresponding reception place of the transport wagon.

13. Shelf-type storage system according to claim 12, wherein the transfer device (60-71) includes
in association with each of two longitudinal ends of the magazines (12)
a carriage (62) adapted to receive a magazine (12); and
outer rails (60) located on the transport wagon (50) positioned adjacent the longitudinal ends of the magazine, the carriage (62) being displaceable along said rails.

14. Shelf-type storage system according to claim 13, further comprising a drive mechanism (64) movable on the outer rails (60);
vertically adjustable stands coupled to the carriage (62), optionally adjustable in height by piston-and-cylinder units (65),
said stands being movably coupled to the carriage (62) and in the region of the drive mechanism.

15. Shelf-type storage system according to claim 13, wherein each carriage (62) includes
supporting angle pieces (70) at positions adjacent the two ends of the magazine (12), for adjustment of the magazine; and
wherein the angle pieces each have a horizontal portion (71) engaging beneath the magazine and a vertical arm (72), located for abutment against a wall of the magazine.

16. Shelf-type storage system according to claim 15, wherein the vertical arm (72) of the supporting angle pieces (70) is beveled in the region of its free end with an upward inclination away from the magazine wall.

17. Shelf-type storage system according to claim 1, further comprising at least one station arranged in the longitudinal direction beside the shelving units at the level of the transport wagon, optionally for the simultaneous reception of two magazines arranged side-by-side,
wherein one of said reception places (1) of the transport wagon (50) includes conveyor means (56), effective when the lifting device (95) is in the lower level position for the exchange of a magazine between a station for storage (90) and a station (91) for removal from storage, and the transport wagon (50).

18. Shelf-type storage system according to claim 17, wherein the conveyor means are formed by a roller track (56) which can be driven in rotation in both directions.

19. Shelf-type storage system according to claim 17, wherein the upper reception level of
the temporary storage station (40) includes local conveyor means (100),
said local conveyor means having parallel spaced conveyor sections; and
wherein a reception place (1) of the transport wagon (50) including the lifting device (95) can be driven between said spaced conveyor sections of the upper reception level (100), the conveyor sections being spaced from said lifting device along the transverse direction.

* * * * *